United States Patent
Thuemler

(10) Patent No.: US 10,308,447 B2
(45) Date of Patent: Jun. 4, 2019

(54) STICK PLACER ASSEMBLY

(71) Applicant: Sierra Pacific Industries, Anderson, CA (US)

(72) Inventor: Nicholas J. Thuemler, Corning, CA (US)

(73) Assignee: Sierra Pacific Industries, Anderson, CA (US)

( * ) Notice: Subject to any disclaimer, the term of this patent is extended or adjusted under 35 U.S.C. 154(b) by 0 days.

(21) Appl. No.: 15/409,171

(22) Filed: Jan. 18, 2017

(65) Prior Publication Data

US 2018/0044122 A1    Feb. 15, 2018

Related U.S. Application Data

(60) Provisional application No. 62/374,516, filed on Aug. 12, 2016.

(51) Int. Cl.
| | |
|---|---|
| B65G 57/00 | (2006.01) |
| B65G 57/18 | (2006.01) |
| B65G 47/252 | (2006.01) |
| B65G 47/90 | (2006.01) |

(52) U.S. Cl.
CPC ......... B65G 57/005 (2013.01); B65G 47/252 (2013.01); B65G 57/18 (2013.01); B65G 47/90 (2013.01); B65G 2201/0282 (2013.01)

(58) Field of Classification Search
CPC .................. B65G 57/005; B65G 57/18; B65G 2201/0282; B25J 15/0213
USPC ...................................................... 414/789.5
See application file for complete search history.

(56) References Cited

U.S. PATENT DOCUMENTS

| | | | | |
|---|---|---|---|---|
| 3,703,954 A | * | 11/1972 | Gudmestad | B65G 17/326 198/803.7 |
| 4,144,976 A | * | 3/1979 | Rysti | B65G 57/18 198/680 |
| 4,810,152 A | * | 3/1989 | Gillingham | B65G 57/005 198/367 |

(Continued)

FOREIGN PATENT DOCUMENTS

| | | |
|---|---|---|
| CA | 2134598 C | 2/2000 |
| CA | 2375329 A1 | 12/2000 |

OTHER PUBLICATIONS

<https://www.youtube.com/watch?v=cMhX9RLdo1E>—accessed Jul. 2016.

(Continued)

*Primary Examiner* — Lynn E Schwenning
(74) *Attorney, Agent, or Firm* — Haynes Beffel & Wolfeld LLP; James F. Hann; Andrew L. Dunlap

(57) ABSTRACT

A separator placer assembly is used with a lumber stacker, which creates a stack of lumber, includes a frame, a separator transfer assembly, and a plurality of transfer arm assemblies. The separator transfer assembly includes a continuous loop chain, preferably a plurality of continuous loop chains, with upper and lower reaches mounted to the frame. Separators are transferred to lugs on the chain at a first position along the lower reach. The plurality of transfer arm assemblies, each with first and second arms, is mounted to the frame beneath the lower reach at a transfer position downstream of the first position. A separator supported by the lugs is removed from the lugs by the arms and released onto the stack of lumber.

23 Claims, 14 Drawing Sheets

(56) References Cited

U.S. PATENT DOCUMENTS

| | | | | |
|---|---|---|---|---|
| 5,263,812 A | * | 11/1993 | Bowlin | B65G 57/18 |
| | | | | 414/789.5 |
| 5,636,965 A | * | 6/1997 | Newnes | B65G 47/918 |
| | | | | 198/468.4 |
| 6,557,692 B2 | * | 5/2003 | Runonen | B65G 47/248 |
| | | | | 198/403 |
| 2003/0029700 A1 | * | 2/2003 | Miller | B65G 17/12 |
| | | | | 198/803.7 |
| 2014/0008927 A1 | * | 1/2014 | Rousseau | B29C 49/4205 |
| | | | | 294/90 |
| 2014/0175819 A1 | * | 6/2014 | Wilson | B25J 15/0028 |
| | | | | 294/198 |

OTHER PUBLICATIONS

<http://www.pendu.com/pdf/3500%20Stacker.pdf>—downloaded Dec. 21, 2016.
CA 2,960,681—First Office Action dated Mar. 5, 2018, 6 pages.
CA 2,960,681—Response to First Office Action dated Mar. 5, 2018, filed May 11, 2018, 24 pages.

* cited by examiner

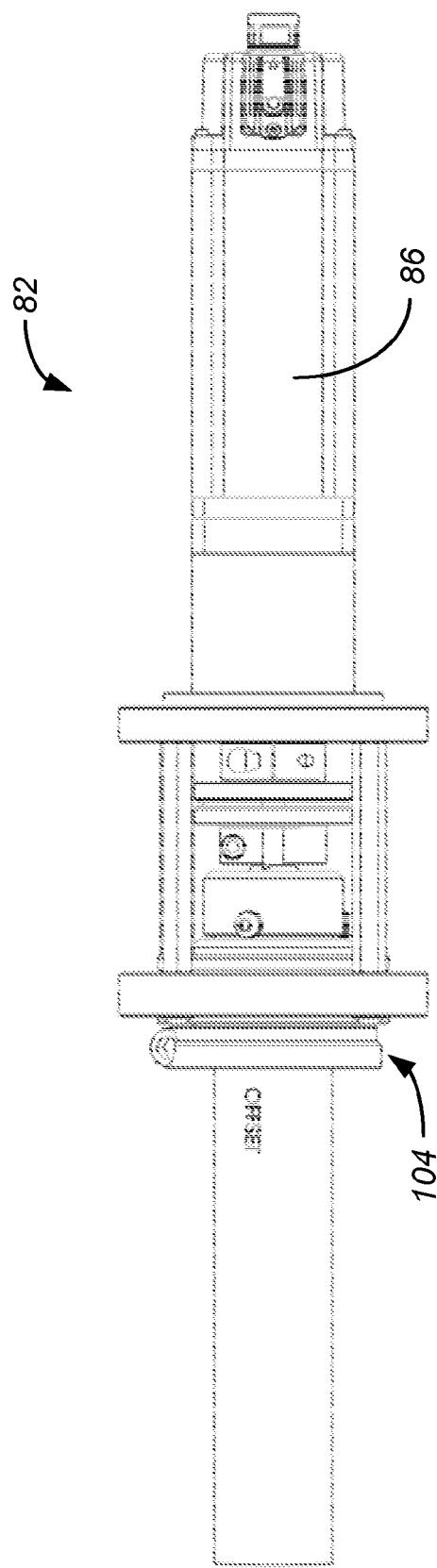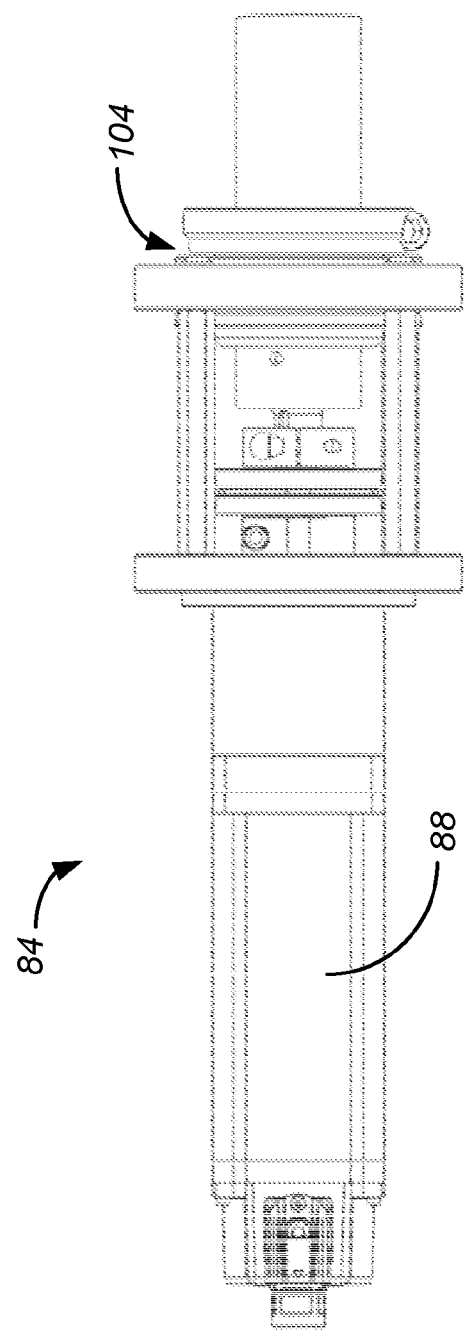

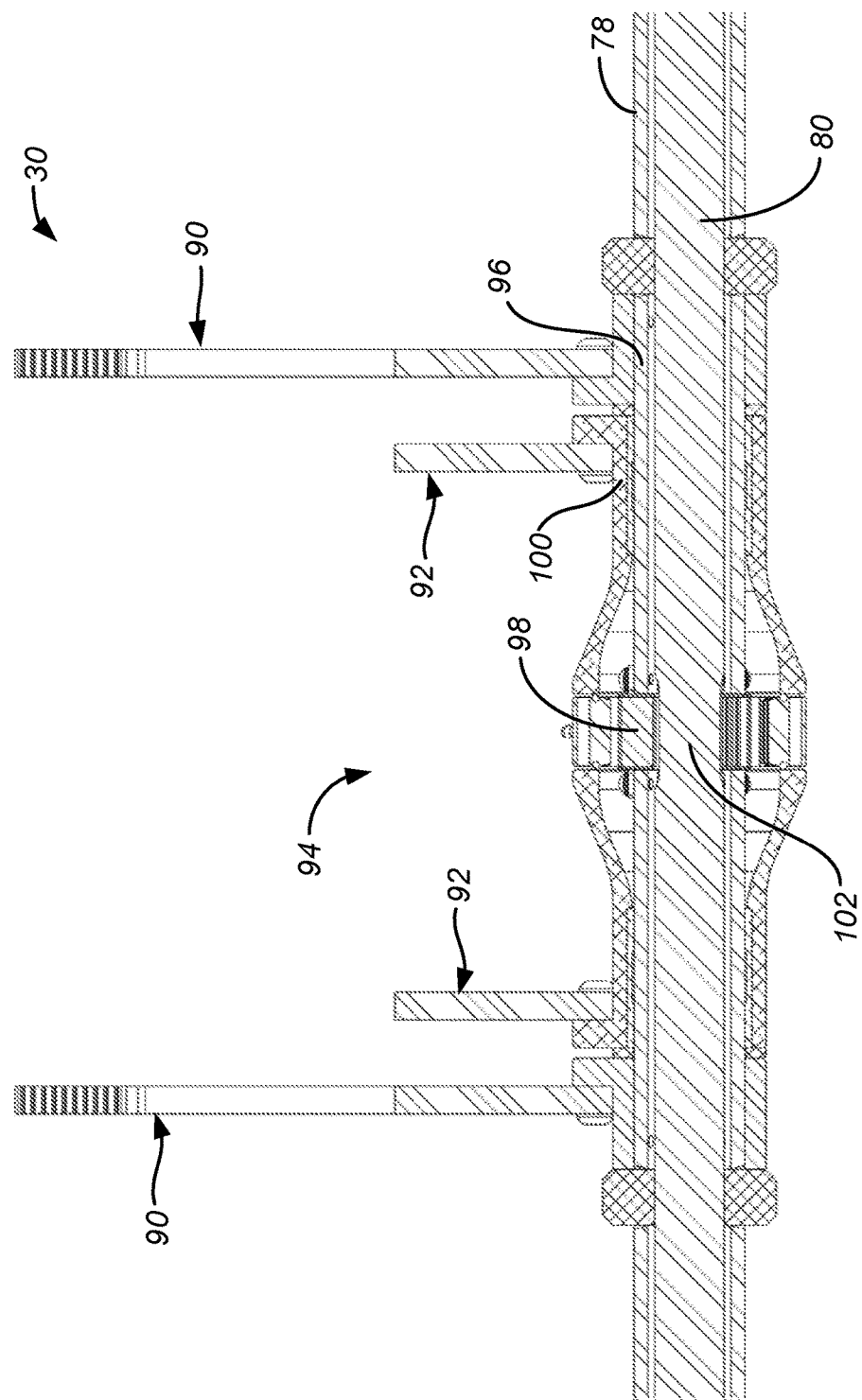

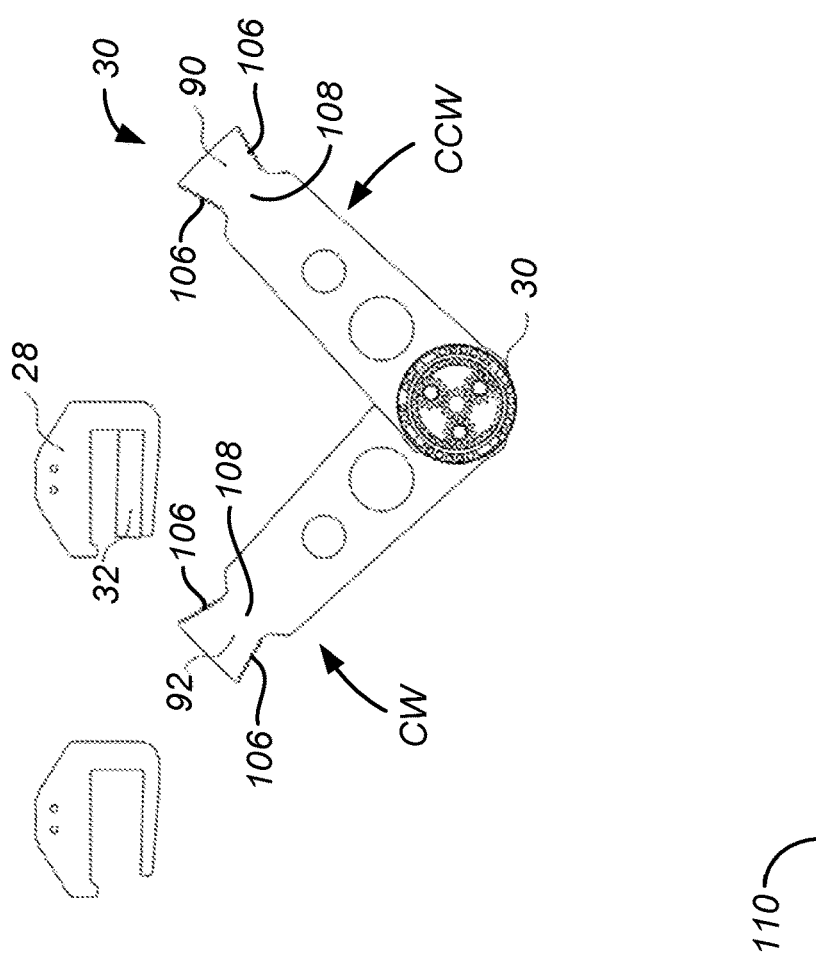

STICK TRANSFER

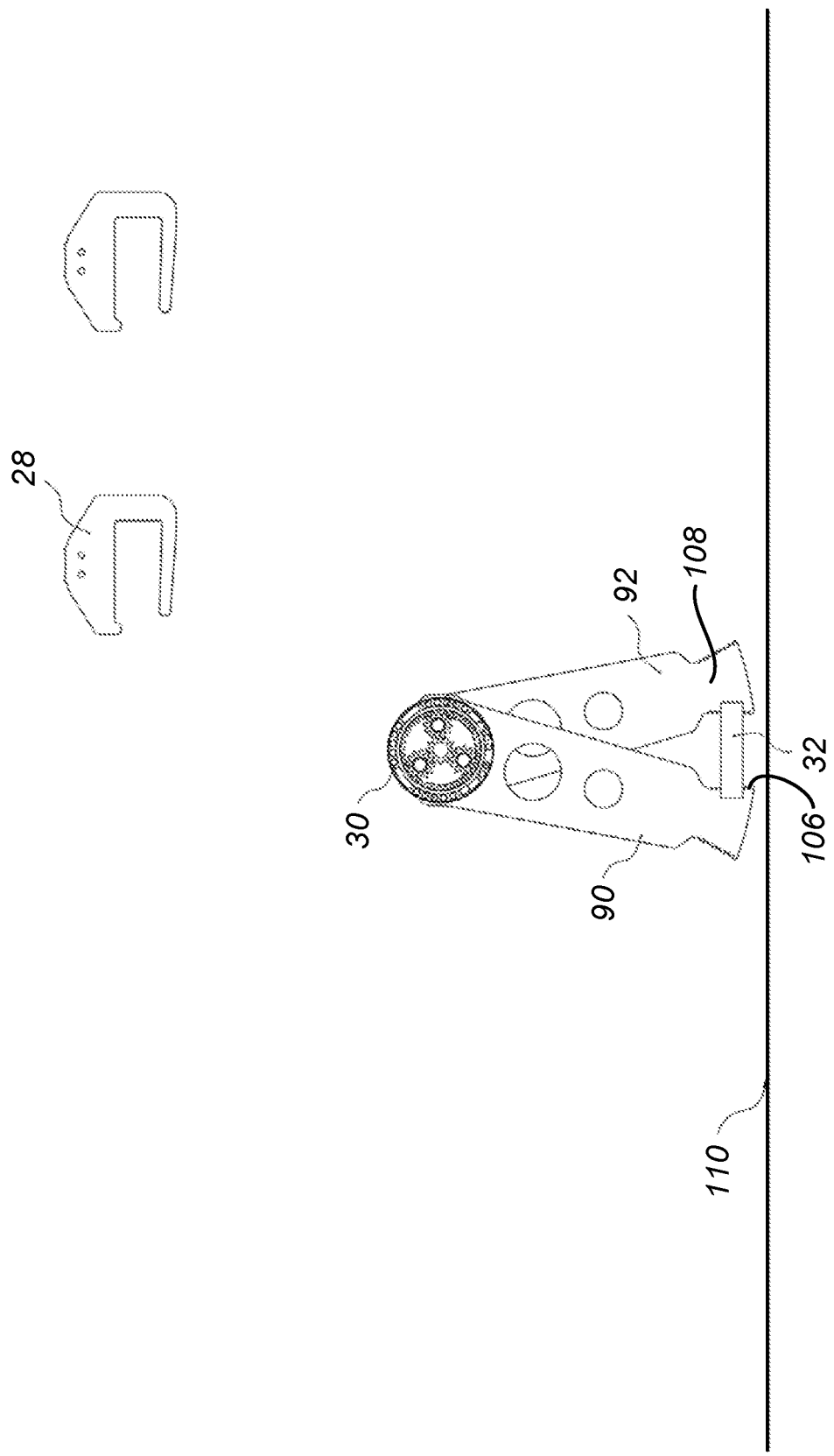

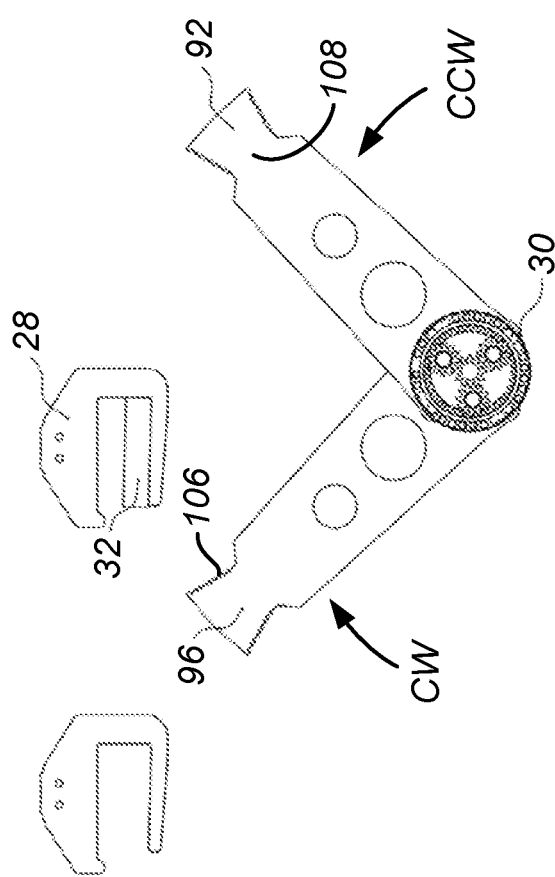
FIG. 13E  RETURN TO WAIT TO FETCH POSITION

STICK PLACER ASSEMBLY

CROSS-REFERENCE TO OTHER APPLICATIONS

This application claims the benefit of U.S. provisional patent application No. 62/374,516 filed 12 Aug. 2016.

BACKGROUND OF THE INVENTION

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

The modern or more conventional way of placing separators, commonly referred to as sticks, between layers of lumber in a lumber stacker in sawmills, is to use an overhead pusher lug type of sorter. The sorter transfers the sticks to slanted or vertical overhead magazines. The magazines overlie the layers of lumber being stacked. The magazines are filled while the stacker is running. Once the magazines have sticks loaded therein, there is another mechanism, comprised of multiple air cylinders and photo eyes, which take the stick from the magazine down to the top of the layer of lumber. For the sticks to fit into the magazines the sticks must be in very good condition. They cannot be bowed, twisted, over-thickness, or broken. They cannot be cracked or a different width from one end to the other. Most of these systems have some kind of a stick scanner which tries to reject out of spec sticks. This means the mills can end up throwing away potentially good sticks. When mills are using tens of thousands of sticks per shift, this can potentially cost the mills a large amount of money annually in purchasing sticks that will run through the system. When an out of spec stick does make it through the system, the resulting jams can cause a large amount of downtime. One example of a conventional lumber stacker with overhead magazines is sold by Pendu Manufacturing, Inc. of New Holland, Pa. as the Pendu 3500 Lumber Stacker.

BRIEF SUMMARY OF THE INVENTION

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

An example of a separator placer assembly, for use with a lumber stacker of the type which places layers of lumber extending in a first direction to create a stack of lumber, includes a frame, the separator transfer assembly, and a plurality of transfer arm assemblies. The separator transfer assembly includes a continuous loop chain mounted to the frame for movement along a continuous loop path. The chain has a lower reach extending between first and second positions. The chain also has separator-supporting lugs sized and configured to support a separator for movement along the lower reach from the first position towards the second position. Separators are transferable to the separator-supporting lugs at the first position. The transfer arm assemblies are mounted to the frame beneath the lower reach. Each transfer arm assembly includes first and second arms, each having outer portions, supported by the frame for: (1) movement of the outer portions in first and second separator-capture directions, respectively, towards one another, allowing a separator supported by separator-supporting lugs to be captured between the outer portions, (2) movement of the outer portions in unison in the first separator-capture direction, allowing a separator captured between the outer portions to be transferred to a place position underlying the lower reach of the first chain, and (3) movement of the outer portions to the second and first separator-capture directions, respectively, away from one another, allowing a separator captured between the outer portions to be released at the place position.

Other examples of the separator placer assembly can include one or more the following. The separator transfer assembly can include a plurality of continuous loop chains. The separator placer assembly can include means for transferring separators from a separator supply to the separator-supporting lugs at the first position. The separator placer assembly can also include a separator loading assembly mounted to the frame and comprising a separator supply, for containing a supply of separators, and a separator loader for transfer of separators from the separator supply to the separator-supporting lugs at the first position. Each transfer arm assembly can include a shaft mounted to the frame and extending in a second direction transverse to the first direction, the first and second arms mounted to the shaft for rotational movement about the shaft. The first and second arms can be supported by the frame for rotational movement in the first and second rotational separator-capture directions. The chain can pass around a sprocket downstream of the second position; a carryover assembly can include carryover lugs moving with the chain and positioned adjacent to the separator-supporting lugs to maintain any separators carried by separator-supporting lugs as the separator-supporting lugs pass around the sprocket.

An example of a stick placer assembly, for use with a lumber stacker of the type which places layers of lumber extending in a first direction to create a stack of lumber, includes a frame, a stick transfer assembly and a plurality of transfer arm assemblies. The stick transfer assembly includes a first, continuous loop chain mounted to the frame for movement along a first, continuous loop path, the chain having a lower reach extending between first and second positions. The first chain has stick-supporting lugs sized and configured to support a stick for movement along the lower reach from the first position towards the second position. The stick transfer assembly also includes means for transferring sticks from a stick supply to the stick-supporting lugs at the first position. The plurality of transfer arm assemblies are mounted to the frame, each transfer arm assembly includes a drive shaft extending in a second direction transverse to the first direction. Each transfer arm assembly also includes means for (1) capturing a stick supported by stick-supporting lugs as the stick passes over the drive shaft, (2) transferring the stick to a place position underlying the lower reach of the first chain, and (3) releasing the stick at the place position.

A first example of a method for placing lumber layer separators, for use with a lumber stacker which places layers of lumber extending in a first direction to create a stack of lumber, onto the stack of lumber, is carried out as follows.

A separator is transferred to a lower reach of each of first and second continuous loop chains for movement along the lower reaches, the continuous loop chains each comprising separator-supporting lugs sized and configured to support the separator for movement along the lower reaches. The separator is moved to a separator transfer position along the lower reaches by movement of the continuous loop chains. The separator it is captured when the separator reaches a separator transfer position along the lower reaches. The separator is transferred to a place position underlying the lower reaches of the continuous loop chains. The separator is released at the place position onto an underlying layer of lumber.

Some examples of the first method can include one or more the following. The method can be carried out with the separators being wooden sticks. The separator capturing can include moving portions of first and second arms towards one another to capture the separator therebetween. The separator transferring can include moving the portions of the first and second arms in unison to move the separator to the place position. The separator releasing can include moving the portions away from one another to release the separator onto the layer of lumber. The separator capturing, transferring and releasing can include rotating the first and second arms as follows: during separator capturing, the first and second arms can move in a first rotary direction and in a second rotary direction, respectively, during separator moving, the first and second arms can both move in the first rotary direction, and during separator releasing, the first and second arms can move in the second and the first rotary directions, respectively.

A second example of a method for placing lumber layer separators, for use with a lumber stacker which places layers of lumber extending in a first direction to create a stack of lumber, onto the stack of lumber, is carried out as follows. First and second continuous loop chains are driven. The continuous loop chains have upper and lower reaches, the lower reaches extending between first and second positions. A separator is selectively moved from a separator supply to a lug space. A separator is sensed when it is at the lug space. A delay signal it is generated when a separator is sensed at a position along the upper reach of the continuous group chains. When: (1) a separator is sensed at the position along the upper reaches, the separator at the position is moved along the upper reaches to the first position by the continuous loop chains, and (2) a separator is not sensed at the position along the upper reaches, the separator at the lug space is moved from the lug space to the first position. The separator at the first position is moved to a separator transfer position along the lower reaches by movement of the continuous loop chains. When the separator reaches the separator transfer position, the separator is captured by capture movement of portions of first and second arms of a transfer on assembly to capture the separator therebetween. The separator is transferred to a place position underlying the lower reaches of the continuous loop chains by transfer movement of the first and second arms. The separator is released at the place position onto an underlying layer of lumber by release movement of the first and second arms.

Some examples of the second method can include one or more the following. The sensing of a separator at the lug space and sensing of a separator at a position along the upper region can include optically sensing the separator. Capturing the separator can include moving the portions of the first and second arms towards one another. Transferring the separator can include moving the portions of the first and second arms in unison in the same direction to move the separator to the place position. Releasing the separator can include moving the portions of the first and second arms away from one another to release the separator onto the layer of lumber. Capturing the separator, transferring the separator and releasing the separator can each include rotating the first and second arms. In some examples during separator capturing, the first and second arms move in a first rotary direction and in a second rotary direction, respectively, during separator moving, the first and second arms both move in the first rotary direction, and during separator releasing, the first and second arms to move in the second and the first rotary directions, respectively. Any separator which has moved past the second position can be guided along the lower reaches onto the upper reaches.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 4 is an enlarged view of one end of the transfer arm assembly of FIG. 3 showing a first arm driver.

FIG. 5 is an enlarged view of the other end of the transfer arm assembly of FIG. 3 showing a second arm driver.

FIG. 12 is an enlarged cross-sectional view of the structure shown in FIG. 8.

FIGS. 13A, 13B, 13C, 13D and 13E illustrate picking a stick from the stick-supporting lugs of the J bar chain by the master and slave arms of the placement fetcher and placing the stick on a layer of lumber.

DESCRIPTION

Figure 1:
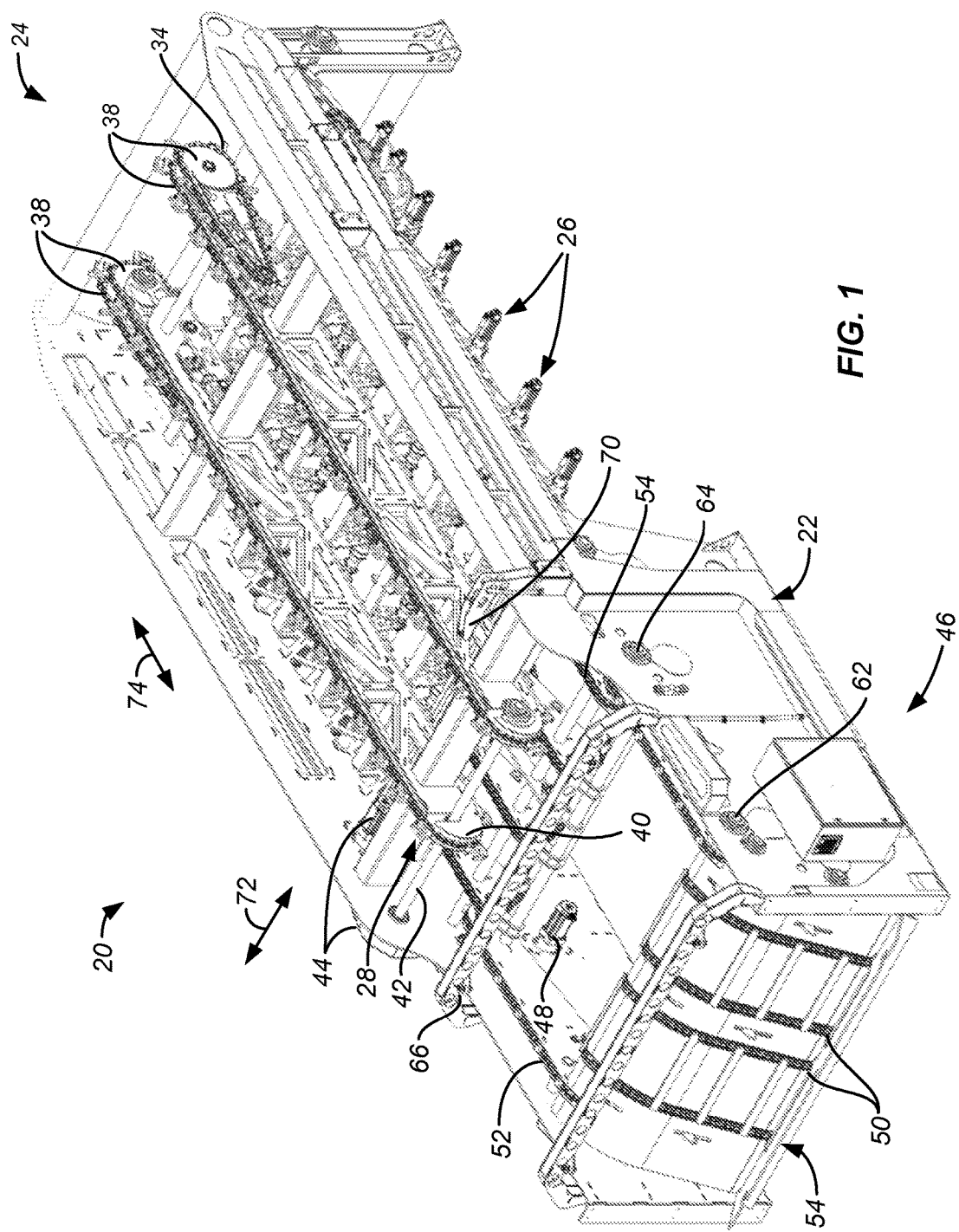
FIG. 1 is an isometric view of a stick placer assembly, sometimes referred to as the machine, including a frame, a stick transfer assembly, and a plurality of transfer arm assemblies.

The following description will typically be with reference to specific structural embodiments and methods. It is to be understood that there is no intention to-be limited to the specifically disclosed embodiments and methods but that other features, elements, methods and embodiments may be used for implementations of this disclosure. Preferred embodiments are described to illustrate the technology disclosed, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

In some examples this technology is used with lumber stackers for placing sticks, also referred to as separators, in between layers of lumber. The spacing between each layer allows air to flow through the stacked packages of lumber for drying in the kilns. This technology is described below primarily with reference to the use with lumber stackers. In other examples this technology can be used in other industries, and may be use for placing elongate elements other than sticks. While sticks and other separators are typically made of wood, other materials can also be used.

The stick placer assembly 20, also referred to as the planetary stick placer 20, does not use a magazine and can take a very poor quality stick 32 because magazines are not used. This also eliminates the need for an expensive stick scanner/rejection system. The planetary fetchers 30 of the transfer arm assemblies 26 grab the stick 32, typically at four points of the stick, with flexible arms 90, 92, typically made of polyurethane, allowing use of sticks 32 with different widths along their lengths and even broken and cracked sticks. Materials other than polyurethane can also be used for the arms 90, 92. One added benefit of the flexible arms 90, 92 is they are not harmed by wrecks. A wreck can occur if there is an issue with the stacker programmable logic controller (PLC) or an operator error. The wreck is between the forks that extend the layers onto the stacked package, and the stick placer. The rigid magazine type of stick placers will often be damaged requiring long amounts of downtime for repair. The planetary stick placer arms 90, 92 simply get pushed out of the way and require no down time at all. The position of the planetary fetchers 30 has the ability to be dynamic. Since there is no fixed magazine, the planetary fetchers 30 can automatically be moved to different positions for odd lengths of lumber.

FIG. 1 is an overall view of an example of a stick placer assembly 20. The stick placer assembly 20 includes a frame 22, a stick transfer assembly 24 mounted to the frame 22, and a number of transfer arm assemblies 26, also mounted to the frame. In this example the stick transfer assembly 24 uses two J bar chains 28, also referred to as the first, continuous loop chains 28, overhead of the transfer arm assemblies 26. J bar chains 28 extend along continuous loop paths 29. The transfer arm assemblies 26 include planetary fetchers 30. The J bar chain 28 carries J bars 31, also referred to as stick-supporting lugs 31, which supports the sticks 32. The J bar chain 28 continuously runs during the operation of the machine; this allows the J bar chain 28 to be kept as full of sticks 32 as possible. All of the sticks 32 not grabbed by the planetary fetchers 30 recirculate around the top of the machine to be reused. This recirculation is made possible by carryover lugs 34. Carryover lugs 34 are carried by a carryover chain 36 passing around one of two sprockets 38 rotated in unison by the movement of the J bar chain 28, which engages one of the sprockets 38. The carryover lugs 34 support the sticks 32 as they travel around the J bar chain 28 take-up sprocket 38. The two J bar chains 28 shown in FIG. 1 are driven by drive sprockets 40, the drive sprockets 40 being rotated by a common drive shaft 42 driven by a motor drive 44.

The J bar chain 28 is loaded by a lugged transfer 46, also referred to as stick loading assembly 46, that is driven by a servo motor 48. Using a servo motor 48 allows the lugged transfer 46 to be stopped and started very quickly allowing the user to do a very good job filling empty J bars 31 and letting loaded J bars 31 to pass by. Stick loading assembly 46 includes first, second and third stick transfer chains 50, 52 and 54 which move sticks 32 from the stick supply 56 to the passing J bars (stick-supporting lugs) 31 at the first position 58 along the lower reach 60 of the first, continuous loop chain 28, lower reach 60 extending to a second position 61 at take-up sprockets 38. The servo motor 48 drives the second stick transfer chains 52 directly; the second stick transfer chains 52 drive the first and third driveshafts 62, 64. Other types of stick loading assemblies 46 can be used. For example, instead of using the first and second stick transfer chains 50, 52 to move sticks 32 from a stick supply 56 to the passing J bars 28 at the first position 58, an overhead lug chain could be used to transport the sticks 32 to the planetary fetchers 30; there would be a support with a moveable gate the sticks 32 could be moved through when they get grabbed and moved to the placing position.

The stick placer assembly 20 has 3 sets of photo eyes tracking the sticks 32 throughout the process. The first set 66 of photo eyes is located on the lugged transfer (stick loading assembly) 46. The first set 66 of photo eyes signals when a stick 32 is in a lug space generally underlying first set 66 of photo eyes ready to be loaded. The second set 68 of photo eyes is located at the entry of the J bar chain 28, that is at or near the first position 58 along the lower reach 60 of the chain 28. This second set 68 signals when is a loaded stick 32 in the J bar chain 28 ready to be placed by the planetary fetchers 30 of the transfer arm assemblies 26. The third and last set 70 of photo eyes is located on the top of the J bar chain 28. This set signals when there is a recirculating stick 32; this information provides the basis for inhibiting the transfer of sticks 32 by the lugged transfer 46.

Figure 2:
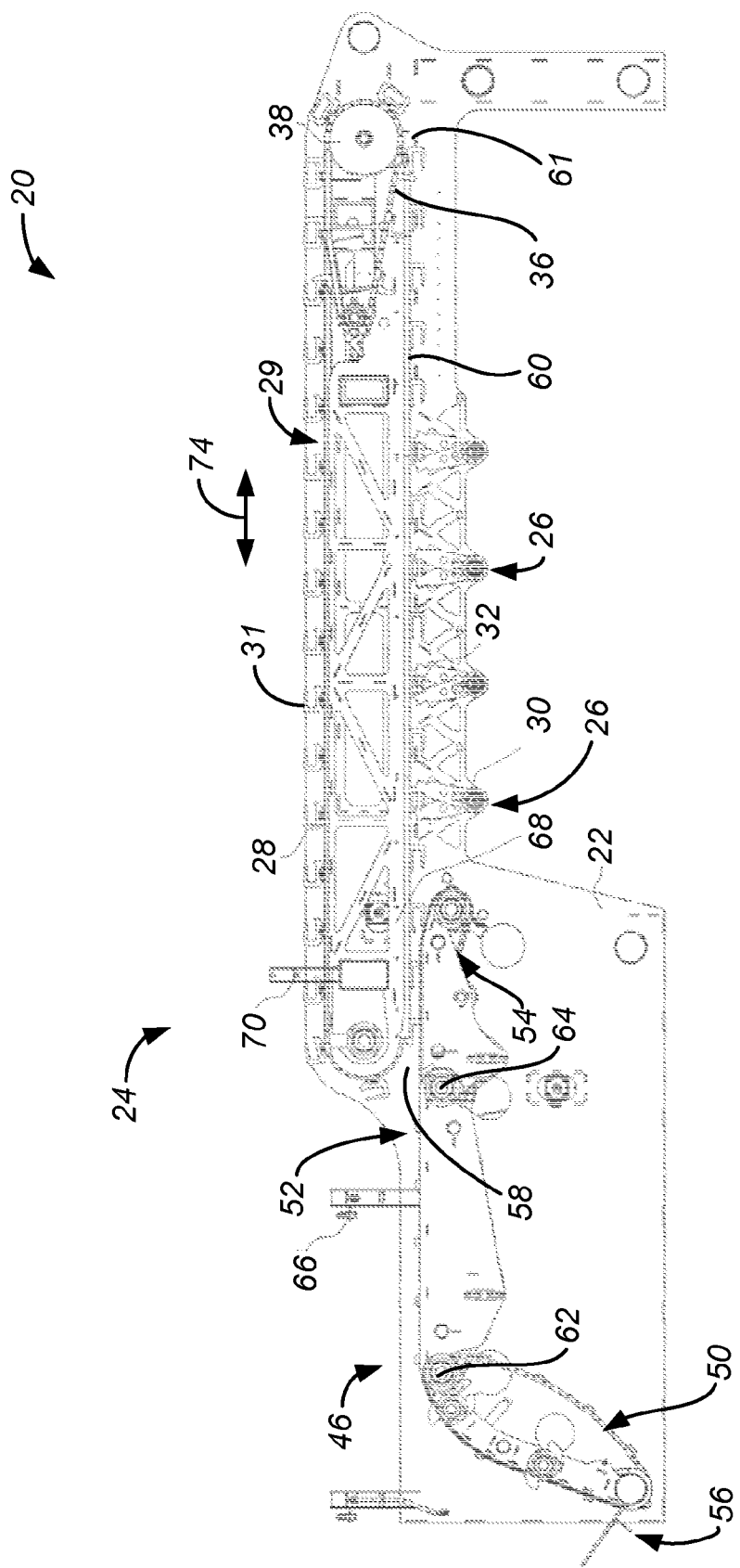
FIG. 2 is a side view of the stick transfer assembly of FIG. 1 with portions of the frame removed to show detail.
Figure 3:
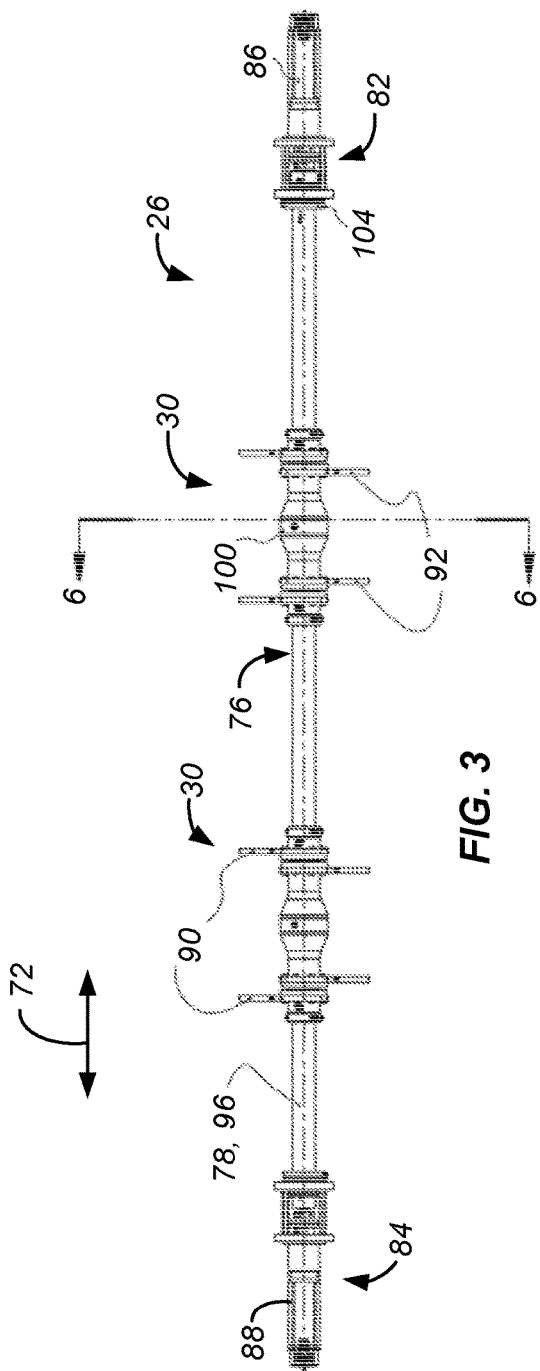
FIG. 3 is a side view of a transfer arm assembly of FIGS. 1 and 2.
Figure 6:
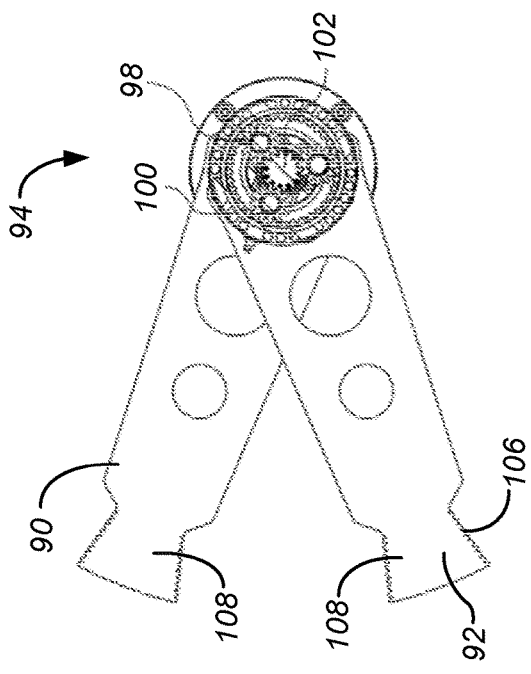
FIG. 6 is an enlarged cross-sectional view taken along line 6-6 of FIG. 3 showing a planetary gear assembly.
Figure 7:
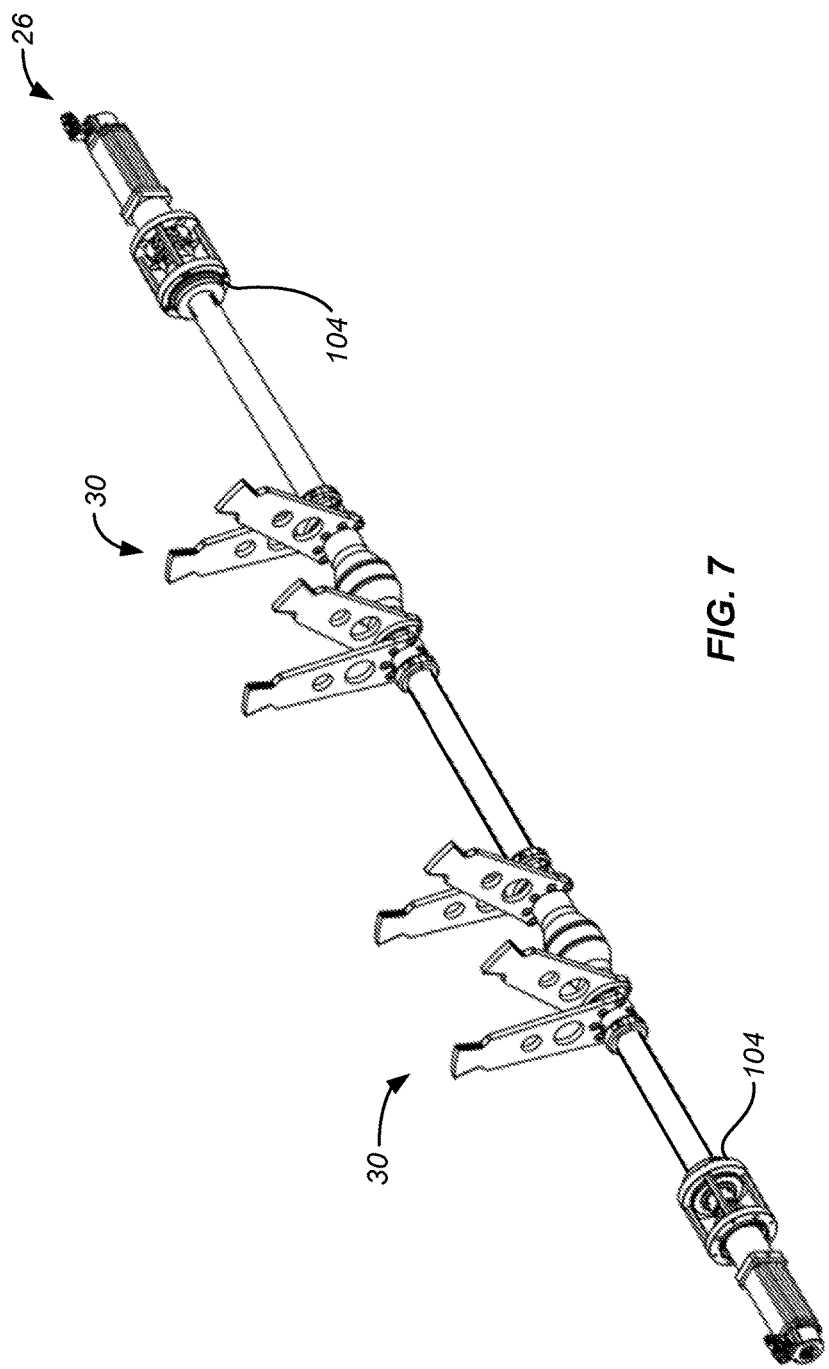
FIG. 7 is an isometric view of the transfer arm assembly of FIG. 3.
Figure 8:
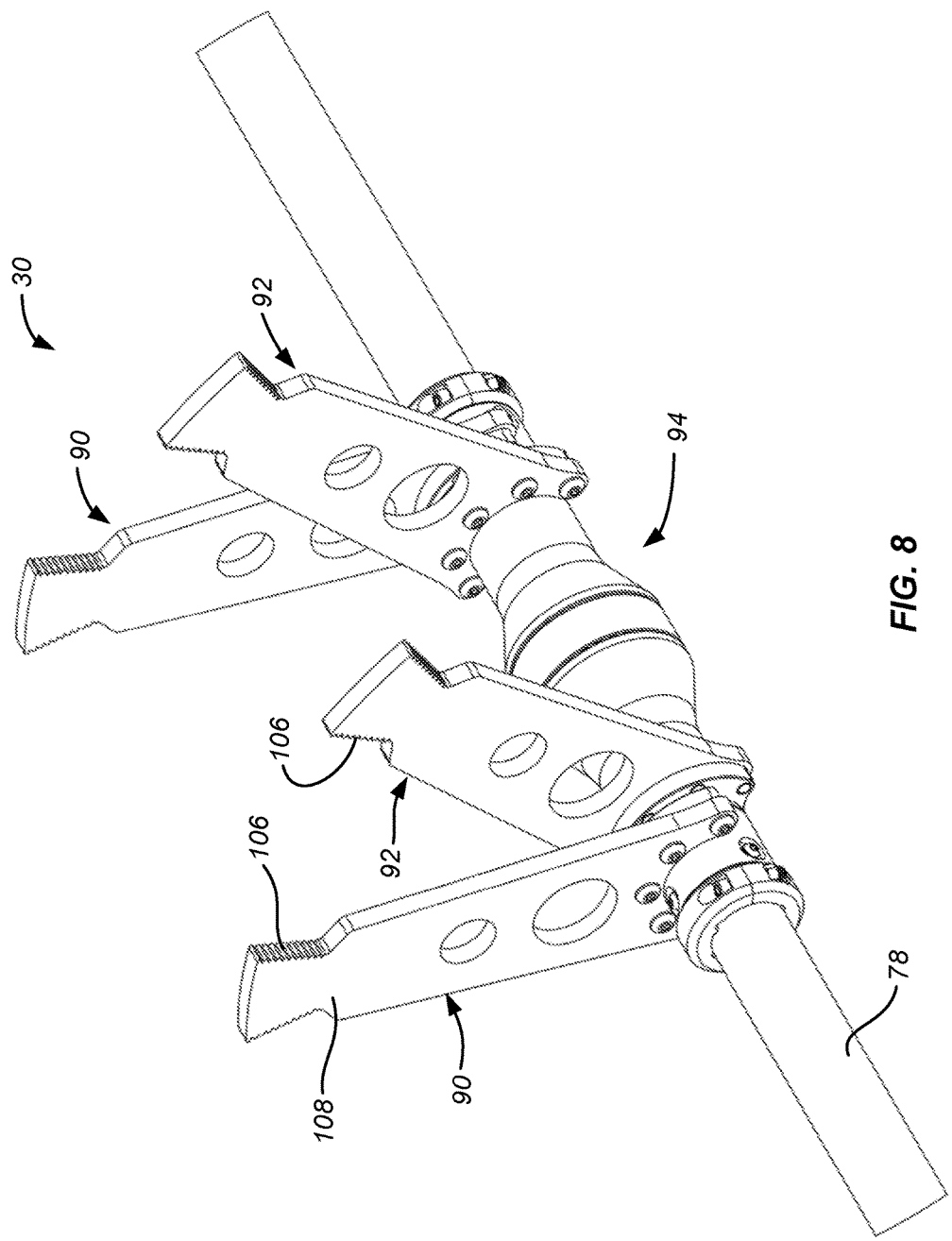
FIG. 8 is an enlarged view of the planetary catcher of FIG. 7 showing a set of arms on either side of a planetary gear assembly.
Figure 9:
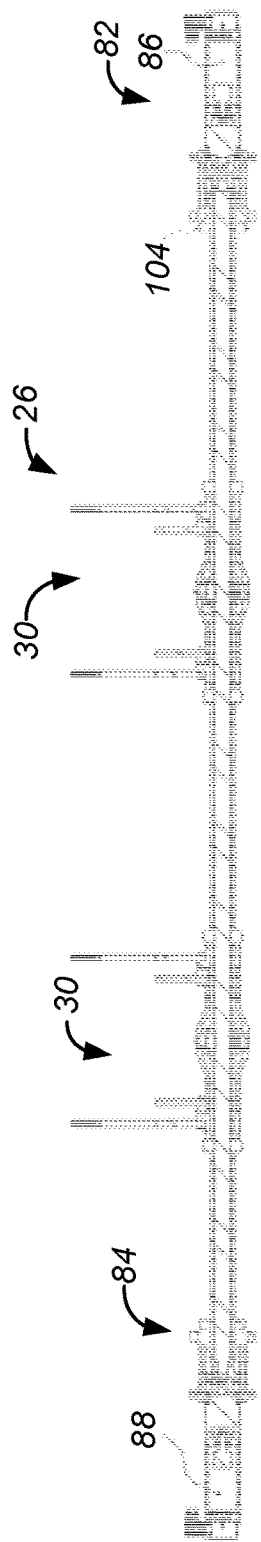
FIG. 9 is a cross-sectional view of the transfer arm assembly of FIG. 3.
Figure 10:
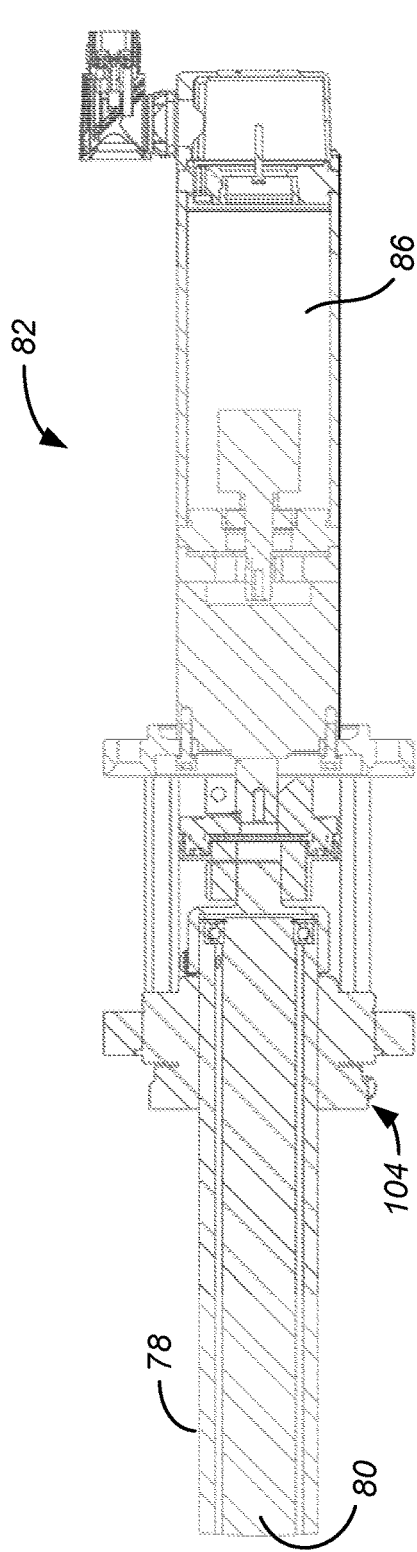
FIG. 10 is a cross-sectional view of the structure of FIG. 4.
Figure 11:
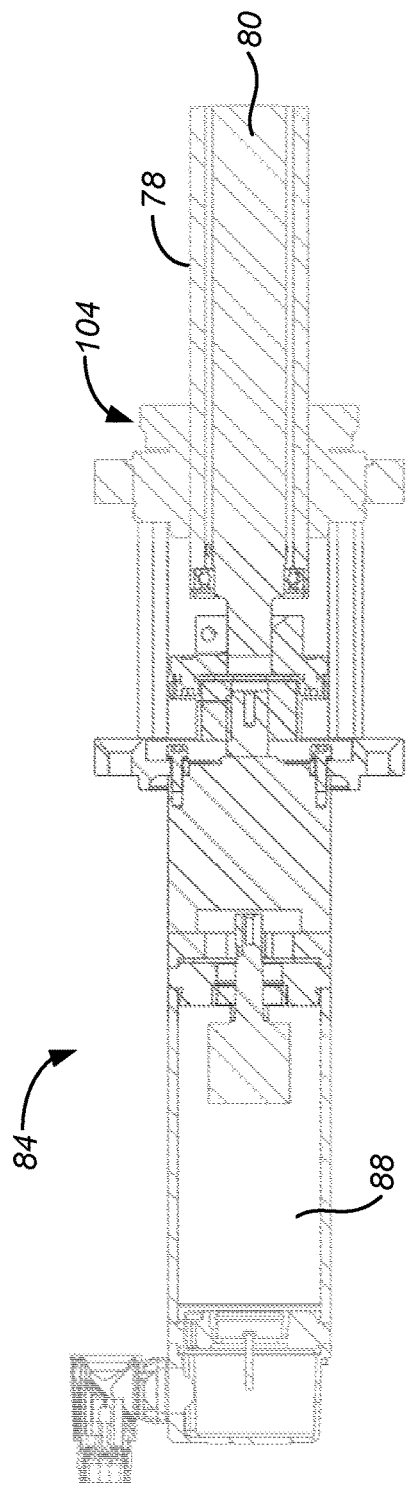
FIG. 11 is a cross-sectional view of the structure of FIG. 5.

When J bar chain 28 is loaded with sticks 32, there are sticks available to be fetched by the planetary fetchers 30, such as shown in FIGS. 2, 3 and 8 p.m. The transfer arm assemblies 26 are located under the J bar chain 28 and are oriented in a second direction 72 perpendicular to the flow in a first direction 74. Planetary fetchers 30 are spaced out at different intervals depending on the length of the lumber being stacked. The position of the planetary fetchers 30 has the ability to be dynamic. Unlike fixed-position magazines, the planetary fetchers 30 can automatically be moved in the first direction 74 to different positions to accommodate different lengths of lumber. For example, this can be done by mounting the moveable planetary fetchers on linear bearings and rails. A servo motor could be attached to each of the moveable planetary fetchers and power transmitted using a rack and pinion gear. These moveable planetary fetchers could be grouped together to minimize the number of servomotors added. Such an arrangement could be controlled manually with a button and predefined fetcher locations, or a length measurement could be used for automatic adjustment.

Each transfer arm assembly 26, see FIGS. 3 and 12, includes a drive shaft 76 extending in the second direction 72. The drive shaft 76 includes first and second rotatable shaft elements 78, 80. Each transfer arm assembly 26 also includes first and second arm drivers 82, 84, see also FIGS. 4 and 5, operably coupled to the first and second rotatable shaft elements 78, 80, respectively, for selective rotation of the first and second rotatable shaft elements. The first and second arm drivers 82, 84 as include electric servo motors 86, 88, respectively. Servo motors 86, 88 are sometimes referred to as master servo motor 86 and slave servo motor 88. The planetary fetchers 30 for each transfer arm assembly 26 have two sets of arms, including two master arms 90 and two slave arms 92. Arms 90, 92 can be made of polyurethane. Master and slave arms 90, 92 are driven by master and slave electric servo motors 86, 88 coaxially through a planetary gear assembly 94. See FIGS. 8 and 12. Master's and slave arms 90, 92 can be driven to any position separately from one another. This is accomplished by the two sets of arms being directly attached to different components of the planetary gear assemblies. The master arms 90 are attached to the planetary carrier 96 part of the assembly 94; this is the part of the assembly 94 that the planetary gears 98 are attached to. Planetary carrier 96 is an extension of the first rotatable shaft element 78. The slave arms 92 are attached to the ring or annulus gear 100 of the planetary gear assembly. The master servo motor 86 of the first arm driver 82 is directly coupled to the same planetary carrier 96 to which the master arms 90 are attached. The slave servo motor 88 of the second arm driver 84 is not attached to the ring/annulus gear 100 to which the slave arms are attached. Slave servo motor 88 is attached to the sun gear 102 of the planetary gear assembly 94. This allows placement of a servo motor on each end of the drive shaft 76 of the transfer arm assembly 26, leaving the center of the machine totally open. The master and slave arms 90, 92 move in the same or different directions and speeds relative to each other depending on the speed and rotation of each servo motor 86, 88. The planetary carrier 96 is considered to be the master because the master arms 90 are directly coupled to this assembly. This means the master arms 90 do exactly what the master servo motor 86 is doing. The slave arms 92 are not directly coupled to the slave servo motor 16. How the slave arms 92 move depends on what the master 86 and slave 88 servo motors are doing in relation to each other. In some examples the master 90 and slave arms 92 alternate every cycle, allowing faster cycle times. So for a first cycle the master arms 90 will lead but in the next cycle master arms 90 will follow. In some examples the arms do not need to make a full revolution to begin the next cycle. See FIGS. 13D and 13E. The entire planetary fetcher 30 rotates on the planetary carrier 96/first rotatable shaft element 78 with shaft element 78 mounted to the main frame 22 by bearings 104.

There are many different ratios that can be made with this planetary gear assembly. Two examples are discussed below.

Stick Clamp/Drop Move

This move is when the master and slave arms 90, 92 are moving toward and away from each other symmetrically. During the clamp move the planetary fetchers 30 are electronically synced to the J bar chains 28. The planetary fetchers 30 can intermittently sync to this chain 28 whenever there is a need for the executed move. In this example each planetary gear 98 has 12 teeth, the ring or annulus gear 100 has 36 teeth, and sun gear 102 has 12 teeth. In this example the slave arms 92 move in the same direction as master arms 90 but must move 7 times faster than the master arms 90 to achieve symmetric motion. The slave to master speed ratio is determined by the tooth count of the different gears in the planetary gear assembly 94.

Planetary Fetcher Move to Wait/Move to Drop

Figure 13B:
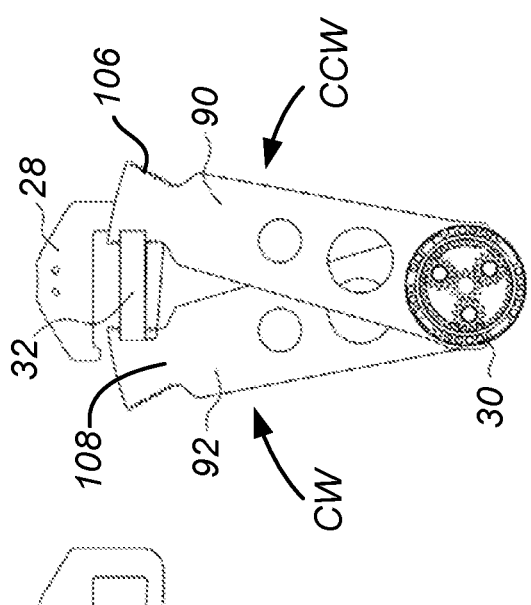
Figure 13C:
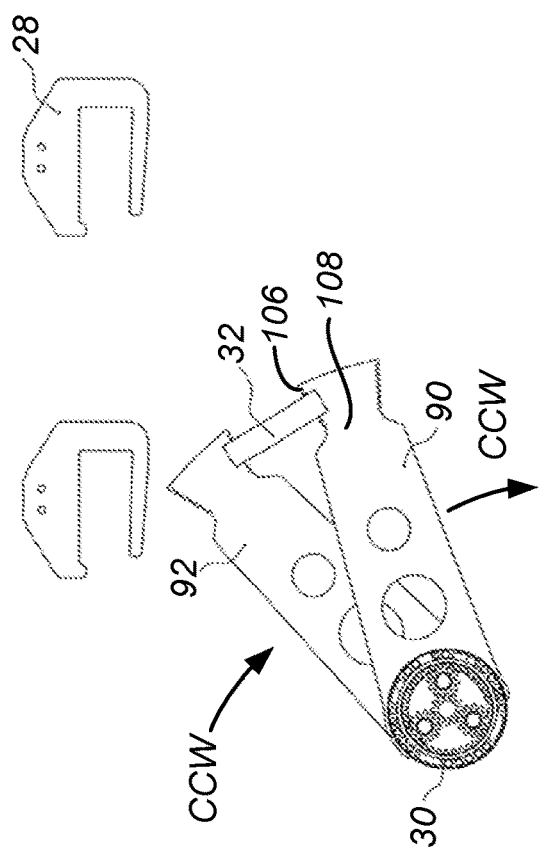

This move is when the stick 32 has been clamped (FIG. 13B) and is moving from the fetch position to the drop position (FIGS. 13C and 13D). The slave arm 92 will travel the same direction and speed as the master arm 90 during this move.

The planetary fetcher 30 has 4 different primary positions. First it has the wait to fetch position shown on FIG. 13A. This shows the J bar chain 28 over the planetary fetcher 30. The planetary fetcher 30 is sitting below the bottom of sticks 32 so sticks 32 can pass through the machine without the arms 90, 92 of planetary fetcher 30 hitting them. Notice that the master arm 90 on the right is leading.

The second position is the clamp position shown in FIG. 13B with the serrated surfaces 106 of the outer ends 108 of arms 90, 92 securing the stick 32 between the arms. This occurs when there is a stick 32 in the stick-supporting lugs 31 of the J bar chain 28 ready to be fetched. When the arms 90, 92 of the planetary fetchers 30 close toward each other, in this example the slave servo motor 88 will be traveling in the same direction but 7 times faster than the master servo motor 86. This happens as the J bar chain 28 is traveling overhead. The planetary fetchers 30 are electronically synced for this move.

The third position is the wait to place position shown in FIG. 13C. This is shown as a clockwise move that occurs while the J bar chain 28 is traveling. This is a move that is preferably synced to the J bar chain; in some examples this move is not synced to the J bar chain. This happens completely separate of what the J bar chain 28 is doing. The arms 90, 92 of the planetary fetchers 30 move to clear the bottoms of sticks 32 traveling overhead. This move is done at a 1:1 ratio.

The fourth position is the place stick position. This can be seen in FIG. 13D and occurs when all of the planetary fetchers 30 have clamped a stick 32 and the stacker (not shown) is ready for sticks 32 to be placed on a layer of lumber 110. Both the master arms 90 and slave arms 92 will move a total of 180 degrees from the clamp position in close proximity to the top of the lumber 110. Notice how the master arms 90 has crossed vertical center in the clockwise direction. This move is done at a 1:1 ratio.

The last stage of the cycle and the final move is shown on FIG. 13E. This is when the planetary fetchers 30 drops the stick 32 and returns to the wait to fetch position all in one move. This is a move that is not synced to the J bar chain 28. This happens completely separate of what the J bar chain 28 is doing. The master arm 90 and slave arm 92 will switch sides from the first cycle during this move. Notice that now the master arm 90 is following to the left of vertical center and the slave arm 92 is now on the right leading. This move is done at a 7:1 ratio in this example. All of these moves happen while the J bar chain 28 is in motion; the J bar chain 28 never stops during the typical operation.

Operational Control

The PLC controls the operation of the stick placer assembly in the following manner. During normal operation the PLC controls the motor drive 44 so that the continuous loop chains 28 move continuously while the system is in operation. The PLC controls the operation of the servo motor 48 of the stick loading assembly 46, sometimes referred to as the stick loading servo motor 48, to control moving sticks 32 from the stick supply 54 to the first position 58 along the lower reach 60 of the continuous loop chains 28. Actuation of the stick loading servo motor 48 causes sticks 32 to be carried from the stick supply 56 to a position underlying the first set 66 of photo eyes.

The first set 66 of photo eyes provides a signal to the PLC indicating when a stick 32 is in a lug space ready to be loaded onto the continuous loop chains 28. The stick is then transferred to the first position 58 along the lower reach 60 of the continuous loop chain 28 unless the third set 70 of photo eyes provides the PLC with a signal that it senses a recirculating stick 32; this case PLC stops the stick loading servo motor 48 to allow the recirculating stick 32 to be delivered to the lower reach 60 of the continuous loop chain 28. The second set 68 of photo eyes provides a signal to the PLC indicating that a stick 32 has been loaded on the stick supporting lugs 31 and is ready to be moved into position for engagement by one of the transfer arm assemblies 26. In this way the transfer arm assemblies 26 are synced to the continuous loop chains 28. The number of sticks 32 passing the second set 68 of photo eyes before the transfer arm assemblies are actuated is generally equal to the number of transfer arm assemblies being used. In this example all of the transfer arm assemblies are being used for sticks 32. In this example sticks 32 are loaded onto every other of the stick supporting lugs on the continuous loop chains 28 in accordance with the spacing of the transfer arm assemblies.

Based on information from the second set 68 of data photo eyes, and the continuous moving nature of the continuous loop chains 28, the PLC provides a series of instructions to the master servo motor 86 and slave servo motor 88. This causes the master arms 90 and slave arms 92 to be rotated as described with reference to FIGS. 13A-13B.

While implementations of the technology are disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the technology disclosed and the scope of the following claims.

Any and all patents, patent applications and printed publications referred to above are incorporated by reference. One or more elements of one or more claims can be combined with elements of other claims.

What is claimed is:

1. A separator placer assembly, for use with a lumber stacker of the type which places layers of lumber extending in a first direction to create a stack of lumber, comprising:
    a frame;
    a separator transfer assembly comprising:
        a continuous loop chain mounted to the frame for movement along a continuous loop path, the chain having a lower reach extending between first and second positions;
        the chain comprising separator-supporting lugs sized and configured to support a separator for movement along the lower reach from the first position towards the second position, separators being transferable to the separator-supporting lugs at the first position;
    a plurality of transfer arm assemblies mounted to the frame beneath the lower reach, each transfer arm assembly comprising:
        first and second arms, each having outer portions, supported by the frame for:
            (1) movement of the outer portions in first and second separator-capture directions, respectively, towards one another, allowing a separator supported by separator-supporting lugs to be captured between the outer portions;
            (2) movement of the outer portions in unison in the first separator-capture direction, allowing a separator captured between the outer portions to be transferred to a place position underlying the lower reach of the chain; and
            (3) movement of the outer portions in the second and first separator-capture directions, respectively, away from one another, allowing a separator captured between the outer portions to be released at the place position,
    wherein each transfer arm assembly comprises an arm driver assembly comprising:
        a shaft, to which the first and second arms are mounted, extending in a second direction transverse to the first direction and comprising first and second rotatable shaft elements, and
        first and second arm drivers operably coupled to the first and second rotatable shaft elements for selective rotation of the first and second rotatable shaft elements,
        whereby selective actuation of the first and second arm drivers selectively rotates the first and second rotatable shaft elements causing movement of the outer portions of the first and second arms.

2. The assembly according to claim 1, wherein the separator transfer assembly comprises a plurality of continuous loop chains.

3. The assembly according to claim 1, further comprising means for transferring separators from a separator supply to the separator-supporting lugs at the first position.

4. The assembly according to claim 1, further comprising a separator loading assembly mounted to the frame and comprising a separator supply, for containing a supply of separators, and a separator loader for transfer of separators from the separator supply to the separator-supporting lugs at the first position.

5. The assembly according to claim 1, wherein the first and second arms are supported by the frame for rotational movement in the first and second separator-capture directions.

6. The assembly according to claim 1, further comprising a separator sensor positioned to detect when a separator is supported by the separator-supporting lugs at a sensor location at or downstream of the first position, whereby the transfer arm assemblies can be synced to the chain according to a detected separator at the sensor location.

7. The assembly according to claim 1, wherein:
    the chain passes around a sprocket downstream of the second position; and
    a carryover assembly comprising carryover lugs moving with the chain and positioned adjacent to the separator-supporting lugs to maintain any separators carried by separator-supporting lugs as the separator-supporting lugs pass around the sprocket.

8. A stick placer assembly, for use with a lumber stacker of the type which places layers of lumber extending in a first direction to create a stack of lumber, comprising:
    a frame;
    a stick transfer assembly comprising:
        a first, continuous loop chain mounted to the frame for movement along a first, continuous loop path, the first chain having a lower reach extending between first and second positions;
        the first chain comprising stick-supporting lugs sized and configured to support a stick for movement along the lower reach from the first position towards the second position;
    means for transferring sticks from a stick supply to the stick-supporting lugs at the first position;

a plurality of transfer arm assemblies mounted to the frame, each transfer arm assembly comprising:
  a drive shaft, extending in a second direction transverse to the first direction; and
  first and second arms for
    (1) capturing a stick supported by stick-supporting lugs as the stick passes over the drive shaft by moving portions of the first and second arms;
    (2) transferring the stick to a place position underlying the lower reach of the first chain; and
    (3) releasing the stick at the place position
  wherein each transfer arm assembly comprises an arm driver assembly comprising:
    a shaft, to which the first and second arms are mounted, extending in a second direction transverse to the first direction and comprising first and second rotatable shaft elements, and
    first and second arm drivers operably coupled to the first and second rotatable shaft elements for selective rotation of the first and second rotatable shaft elements,
    whereby selective actuation of the first and second arm drivers selectively rotates the first and second rotatable shaft elements causing movement of outer portions of the first and second arms.

9. A method for placing lumber layer separators, for use with a lumber stacker which places layers of lumber extending in a first direction to create a stack of lumber, onto the stack of lumber, the lumber stacker including a plurality of transfer arm assemblies, each including an arm driver assembly including first and second arm drivers for driving first and second arms, the method comprising:
  transferring a separator to a lower reach of each of first and second continuous loop chains for movement along the lower reaches, the continuous loop chains each comprising separator-supporting lugs sized and configured to support the separator for movement along the lower reaches; and
  moving the separator to a separator transfer position along the lower reaches by movement of the continuous loop chains;
  capturing the separator by an arm driver assembly of a transfer arm assembly moving portions of first and second arms of the transfer arm assembly when the separator reaches a separator transfer position along the lower reaches;
  transferring the separator to a place position underlying the lower reaches of the continuous loop chains; and
  releasing the separator at the place position onto an underlying layer of lumber,
  wherein the arm driver assembly of each transfer arm assembly further comprises:
    a shaft, to which the first and second arms are mounted, extending in a second direction transverse to the first direction and comprising first and second rotatable shaft elements, and
    first and second arm drivers operably coupled to the first and second rotatable shaft elements for selective rotation of the first and second rotatable shaft elements, and
  wherein the capturing of the separator, the transferring of the separator and the releasing of the separator are performed by selectively actuating the first and second arm drivers to selectively rotate the first and second rotatable shaft elements causing movement of outer portions of the first and second arms.

10. The method according to claim 9, wherein the method is carried out with the separators being wooden sticks.

11. The method according to claim 9, wherein separator capturing comprises moving portions of the first and second arms towards one another to capture the separator therebetween.

12. The method according to claim 11, wherein separator transferring comprises moving the portions of the first and second arms in unison to move the separator to the place position.

13. The method according to claim 12, wherein separator releasing comprises moving the portions away from one another to release the separator onto the layer of lumber.

14. The method according to claim 13, wherein:
  during separator capturing, the first and second arms move in a first rotary direction and in a second rotary direction, respectively;
  during separator moving, the first and second arms both move in the first rotary direction; and
  during separator releasing, the first and second arms move in the second and the first rotary directions, respectively.

15. The method according to claim 14, wherein following separator releasing, further comprising:
  moving a second separator to the separator transfer position along the lower reaches by movement of the continuous loop chains;
  capturing the second separator when the separator reaches a separator transfer position along the lower reaches by moving the first and second arms in the second and first rotary directions, respectively, so that the outer portions move towards one another to capture the second separator therebetween;
  transferring the second separator to a place position underlying the lower reaches of the continuous loop chains by moving the first and second arms in the second rotary direction; and
  releasing the second separator at the place position onto an underlying layer of lumber by moving the first and second arms in the first and second rotary directions, respectively.

16. A method for placing lumber layer separators, for use with a lumber stacker which places layers of lumber extending in a first direction to create a stack of lumber, onto the stack of lumber, the lumber stacker including a plurality of transfer arm assemblies, each including an arm driver assembly including first and second arm drivers for driving first and second arms, the method comprising:
  driving first and second continuous loop chains, the continuous loop chains having upper and lower reaches, the lower reaches extending between first and second positions;
  selectively moving a separator from a separator supply to a lug space;
  sensing when a separator is at the lug space;
  generating a delay signal when a separator is sensed at a position along the upper reach of the continuous loop chains;
  when: (1) a separator is sensed at the position along the upper reaches, move the separator at the position along the upper reaches to the first position by the continuous loop chains, and (2) a separator is not sensed at the position along the upper reaches, move the separator at the lug space from the lug space to the first position;
  moving the separator at the first position to a separator transfer position along the lower reaches by movement of the continuous loop chains;

capturing the separator, when the separator reaches the separator transfer position, by an arm driver assembly of a transfer arm assembly moving portions of first and second arms of a transfer arm assembly to capture the separator therebetween;

transferring the separator to a place position underlying the lower reaches of the continuous loop chains by transfer movement of the first and second arms; and releasing the separator at the place position onto an underlying layer of lumber by release movement of the first and second arms, wherein the arm driver assembly of each transfer arm assembly further comprises:
  a shaft, to which the first and second arms are mounted, extending in a second direction transverse to the first direction and comprising first and second rotatable shaft elements,
  first and second arm drivers operably coupled to the first and second rotatable shaft elements for selective rotation of the first and second rotatable shaft elements,
  wherein the capturing of the separator, the transferring of the separator and the releasing of the separator are performed by selectively actuating the first and second arm drivers to selectively rotate the first and second rotatable shaft elements causing movement of outer portions of the first and second arms.

17. The method according to claim 16, wherein the sensing of a separator at the lug space and sensing of a separator at a position along the upper reach comprises optically sensing the separator.

18. The method according to claim 16, wherein capturing the separator comprises moving the portions of the first and second arms towards one another.

19. The method according to claim 16, wherein transferring the separator comprises moving the portions of the first and second arms in unison in the same direction to move the separator to the place position.

20. The method according to claim 16, wherein releasing the separator comprises moving the portions of the first and second arms away from one another to release the separator onto the layer of lumber.

21. The method according to claim 16, wherein:
  during separator capturing, the first and second arms move in a first rotary direction and in a second rotary direction, respectively;
  during separator moving, the first and second arms both move in the first rotary direction; and
  during separator releasing, the first and second arms to move in the second and the first rotary directions, respectively.

22. The method according to claim 21, wherein following separator releasing, further comprising:
  moving a second separator to the separator transfer position along the lower reaches by movement of the continuous loop chains;
  capturing the second separator when the separator reaches a separator transfer position along the lower reaches by moving the first and second arms in the second and first rotary directions, respectively, so that the outer portions move towards one another to capture the second separator therebetween;
  transferring the second separator to a place position underlying the lower reaches of the continuous loop chains by moving the first and second arms in the second rotary direction; and
  releasing the second separator at the place position onto an underlying layer of lumber by moving the first and second arms in the first and second rotary directions, respectively.

23. The method according to claim 16, further comprising guiding any separator which has moved past the second position along the lower reaches onto the upper reaches.

* * * * *